US012756662B2

(12) United States Patent
Ghosh et al.

(10) Patent No.: US 12,756,662 B2
(45) Date of Patent: Oct. 6, 2026

(54) CALCULATING AND UTILIZING POWER METRICS FOR CONNECTED NETWORK DEVICES

(71) Applicant: Juniper Networks, Inc., Sunnyvale, CA (US)

(72) Inventors: Sandip Kumar Ghosh, Bangalore (IN); Prashanth Kumar H P, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 198 days.

(21) Appl. No.: 18/758,823

(22) Filed: Jun. 28, 2024

(65) Prior Publication Data

US 2025/0103120 A1 Mar. 27, 2025

(30) Foreign Application Priority Data

Sep. 26, 2023 (IN) ............................ 202341064503

(51) Int. Cl.
*H04L 45/00* (2022.01)
*G06F 1/28* (2006.01)
(Continued)

(52) U.S. Cl.
CPC ................ *H04L 45/70* (2013.01); *G06F 1/28* (2013.01); *G06F 1/3206* (2013.01); (Continued)

(58) Field of Classification Search
None
See application file for complete search history.

(56) References Cited

U.S. PATENT DOCUMENTS

| | | | |
|---|---|---|---|
| 5,367,517 | A | 11/1994 | Cidon et al. |
| 7,417,985 | B1 | 8/2008 | McCrosky et al. |

(Continued)

FOREIGN PATENT DOCUMENTS

| | | | |
|---|---|---|---|
| CN | 113841106 | A | 12/2021 |
| CN | 115550286 | A | 12/2022 |

(Continued)

OTHER PUBLICATIONS

Bierman et al., “A YANG Data Model for Hardware Management,” Internet Engineering Task Force (IETF), Request for Comments: 8348, Mar. 2018, 60 Pages.

(Continued)

*Primary Examiner* — Paul Yen
(74) *Attorney, Agent, or Firm* — Harrity & Harrity, LLP

(57) ABSTRACT

A network device may determine a bandwidth utilization and a power consumption by the network device, and may receive a carbon emission value and an electricity cost associated with the network device. The network device may determine weights for the power consumption, the carbon emission value, and the electricity cost, and may calculate one or more of a unit power metric, a per link power metric, a per component power metric, or a per device power metric based on the bandwidth utilization, the power consumption, the carbon emission value, the electricity cost, and the weights. The network device may perform one or more actions based on the one or more of the unit power metric, the per link power metric, the per component power metric, or the per device power metric.

20 Claims, 13 Drawing Sheets

(51) Int. Cl.

| | |
|---|---|
| ***G06F 1/3206*** | (2019.01) |
| ***G06F 1/3234*** | (2019.01) |
| ***H04L 12/12*** | (2006.01) |
| ***H04L 41/0604*** | (2022.01) |
| ***H04L 41/069*** | (2022.01) |
| ***H04L 43/10*** | (2022.01) |
| ***H04L 45/02*** | (2022.01) |
| ***H04L 45/03*** | (2022.01) |
| ***H04L 45/12*** | (2022.01) |
| ***H04L 45/24*** | (2022.01) |
| ***H04L 45/28*** | (2022.01) |
| ***H04L 47/10*** | (2022.01) |
| ***H04L 47/12*** | (2022.01) |
| ***H04L 47/125*** | (2022.01) |
| ***H04W 52/02*** | (2009.01) |
| *G06Q 30/018* | (2023.01) |

(52) U.S. Cl.

CPC ............ *G06F 1/3234* (2013.01); *H04L 12/12* (2013.01); *H04L 41/0622* (2013.01); *H04L 41/0627* (2013.01); *H04L 41/069* (2013.01); *H04L 43/10* (2013.01); *H04L 45/02* (2013.01); *H04L 45/03* (2022.05); *H04L 45/126* (2013.01); *H04L 45/245* (2013.01); *H04L 45/28* (2013.01); *H04L 47/12* (2013.01); *H04L 47/125* (2013.01); *H04L 47/29* (2013.01); *H04W 52/0235* (2013.01); *H04W 52/0248* (2013.01); *H04W 52/0274* (2013.01); *G06Q 30/018* (2013.01)

(56) References Cited

U.S. PATENT DOCUMENTS

| | | | |
|---|---|---|---|
| 8,340,111 | B1 | 12/2012 | Krivitski et al. |
| 8,570,160 | B2 | 10/2013 | Speegle et al. |
| 9,509,377 | B2 | 11/2016 | Sayana et al. |
| 9,606,604 | B1 | 3/2017 | Butter |
| 9,992,129 | B2 | 6/2018 | Grosso et al. |
| 10,326,638 | B2 | 6/2019 | Banerjee et al. |
| 10,552,253 | B2 | 2/2020 | Iyer et al. |
| 10,819,556 | B1 | 10/2020 | Rangasamy et al. |
| 10,972,293 | B1 | 4/2021 | Benyamin et al. |
| 12,021,689 | B1 | 6/2024 | Rayes et al. |
| 12,079,061 | B2 | 9/2024 | Srivastava et al. |
| 2003/0185208 | A1 | 10/2003 | Kim et al. |
| 2003/0202468 | A1 | 10/2003 | Kennedy et al. |
| 2007/0201380 | A1 | 8/2007 | Ma et al. |
| 2007/0283178 | A1 | 12/2007 | Dodeja et al. |
| 2008/0304519 | A1 | 12/2008 | Koenen et al. |
| 2009/0204828 | A1 | 8/2009 | Diab et al. |
| 2010/0057386 | A1 | 3/2010 | Hillis et al. |
| 2010/0118753 | A1 | 5/2010 | Mandin et al. |
| 2010/0277296 | A1 | 11/2010 | DeMille |
| 2011/0038291 | A1 | 2/2011 | Seok |
| 2011/0161709 | A1 | 6/2011 | Chen |
| 2011/0310736 | A1 | 12/2011 | Dighe et al. |
| 2012/0063364 | A1 | 3/2012 | Emmelmann et al. |
| 2012/0127894 | A1 | 5/2012 | Nachum |
| 2013/0003559 | A1 | 1/2013 | Matthews |
| 2013/0042126 | A1 | 2/2013 | Ganesan et al. |
| 2013/0070754 | A1 | 3/2013 | Iovanna et al. |
| 2013/0286846 | A1 | 10/2013 | Atlas et al. |
| 2013/0322258 | A1 | 12/2013 | Akhter et al. |
| 2013/0332762 | A1 | 12/2013 | Meirosu et al. |
| 2014/0119252 | A1 | 5/2014 | Kella et al. |
| 2014/0155029 | A1 | 6/2014 | Kolaks et al. |
| 2014/0169176 | A1 | 6/2014 | Brock |
| 2014/0191733 | A1 | 7/2014 | Kaanta et al. |
| 2014/0321315 | A1 | 10/2014 | Akhter et al. |
| 2014/0372576 | A1 | 12/2014 | Mohandas et al. |
| 2015/0188354 | A1 | 7/2015 | Sun et al. |
| 2015/0208341 | A1 | 7/2015 | Mohamed et al. |
| 2015/0288599 | A1 | 10/2015 | Zhou et al. |
| 2015/0312769 | A1 | 10/2015 | Shindo |
| 2016/0094435 | A1 | 3/2016 | Goss et al. |
| 2016/0164794 | A1 | 6/2016 | Ramalingam et al. |
| 2016/0197784 | A1 | 7/2016 | Gandhi et al. |
| 2016/0253522 | A1 | 9/2016 | Wirch et al. |
| 2016/0302203 | A1 | 10/2016 | Liu et al. |
| 2017/0117709 | A1 | 4/2017 | Svedendahl et al. |
| 2017/0201425 | A1 | 7/2017 | Marinelli et al. |
| 2017/0214539 | A1 | 7/2017 | Chu et al. |
| 2018/0206190 | A1 | 7/2018 | Cherian et al. |
| 2018/0241466 | A1 | 8/2018 | Inagaki |
| 2018/0343613 | A1 | 11/2018 | Levy et al. |
| 2019/0163255 | A1 | 5/2019 | Dewey et al. |
| 2019/0190575 | A1 | 6/2019 | Stjernman et al. |
| 2019/0258807 | A1 | 8/2019 | Dimaggio et al. |
| 2020/0067821 | A1 | 2/2020 | Sebastian |
| 2020/0250125 | A1 | 8/2020 | Yoshihara et al. |
| 2020/0371578 | A1 | 11/2020 | Murali et al. |
| 2021/0044444 | A1 | 2/2021 | Shukla et al. |
| 2021/0216685 | A1 | 7/2021 | Su et al. |
| 2021/0218704 | A1 | 7/2021 | Zhang et al. |
| 2021/0385692 | A1 | 12/2021 | Kwon et al. |
| 2022/0011840 | A1 | 1/2022 | Parks et al. |
| 2022/0116862 | A1 | 4/2022 | Cariou |
| 2022/0166705 | A1 | 5/2022 | Froese |
| 2022/0239547 | A1 | 7/2022 | Wang et al. |
| 2022/0369403 | A1 | 11/2022 | Fang et al. |
| 2023/0029987 | A1 | 2/2023 | Gandhi et al. |
| 2023/0062989 | A1 | 3/2023 | Kim et al. |
| 2023/0319722 | A1 | 10/2023 | Wang et al. |
| 2023/0325342 | A1 | 10/2023 | Srivastava et al. |
| 2023/0393772 | A1 | 12/2023 | Benisty et al. |
| 2024/0137860 | A1 | 4/2024 | Asterjadhi et al. |
| 2024/0205823 | A1 | 6/2024 | Yang et al. |
| 2024/0214313 | A1 | 6/2024 | Voit et al. |
| 2024/0256014 | A1 | 8/2024 | Brar et al. |
| 2024/0333590 | A1 | 10/2024 | Pignataro et al. |
| 2024/0349373 | A1 | 10/2024 | Dong |
| 2024/0381259 | A1 | 11/2024 | Mondal et al. |
| 2024/0422101 | A1 | 12/2024 | Sivakumar et al. |
| 2025/0007810 | A1 | 1/2025 | Ashlock et al. |
| 2025/0039057 | A1 | 1/2025 | Ashlock et al. |
| 2025/0039097 | A1 | 1/2025 | Kazimirsky et al. |
| 2025/0080464 | A1 | 3/2025 | Pignataro et al. |
| 2025/0193954 | A1 | 6/2025 | Yun et al. |

FOREIGN PATENT DOCUMENTS

| | | | |
|---|---|---|---|
| CN | 116017782 | A | 4/2023 |
| EP | 4061063 | A1 | 9/2022 |
| WO | 2012155987 | A1 | 11/2012 |
| WO | 2022228085 | A1 | 11/2022 |

OTHER PUBLICATIONS

Bierman et al., "A YANG Data Model for System Management," Internet Engineering Task Force (IETF), Request for Comments: 7317, Aug. 2014, 35 Pages.

Bjorklund et al., "The YANG 1.1 Data Modeling Language," Internet Engineering Task Force (IETF), Request for Comments: 7950, Aug. 2016, 217 Pages.

Bjorklund, M., (Ed.,) "YANG—A Data Modeling Language for the Network Configuration Protocol (NETCONF)," IETF RFC 6020, http://datatracker.ietf.org/doc/rfc6020/, Oct. 2010, 173 pages.

Bonica et al., "Extended ICMP to Support Multi-Part Messages," Network Working Group, Request for Comments:4884, Apr. 2007, 19 Pages.

"Chkirbene, Z., et al., "Efficient Techniques for Energy Saving in Data Center Networks", Computer Communications, Elsevier Science Publishers Bv, Amsterdam, NL, vol. 129, Jul. 29, 2018, pp. 111-124, XP085477963, ISSN: 0140-3664, DOI:10.1016/J.COMCOM.2018.07.025".

Dhanuka A., et al., "How to Use Energy Efficient Ethernet (IEEE 802.3az) With Texas Instruments Ethernet PHYs," Texas Instruments, SNLA328—Oct. 2019, 15 Pages.

(56) References Cited

OTHER PUBLICATIONS

Ethernet Switching User Guide, Juniper Networks, Website: https://standards.ieee.org/ieee/802.1AB/6047/, Dec. 14, 2023, 1158 Pages.

Extended European Search Report for European Application No. EP24150429.9 dated Jul. 2, 2024, 11 pages.

Extended European Search Report for European Application No. EP24151927 dated Jul. 16, 2024, 10 pages.

Extended European Search Report for European Application No. EP241871235 dated Dec. 6, 2024, 10 pages.

Extended European Search Report for European Application No. EP241877513 dated Dec. 9, 2024, 41 pages.

Extended European Search Report for European Application No. EP24188097 dated Dec. 18, 2024, 8 pages.

Ginsberg et al., "Advertising Generic Information in IS-IS," Internet Engineering Task Force (IETF), Request for Comments: Dec. 2010, 11 Pages.

Gupta, M., et al., Dynamic Ethernet Link Shutdown for Energy Conservation on Ethernet Links, IEEE International Conference on Communications (ICC), Jun. 1, 2007, pp. 6156-6161.

IEEE Standard for Local and metropolitan area networks, "Station and Media Access Control Connectivity Discovery," IEEE Computer Society, Website: https://www.juniper.net/documentation/us/en/software/junos/useraccess/topics/ref/statement/lldp-edit-protocols.html, 2016, 146 Pages.

IEEE Standards Association., "Station and Media Access Control Connectivity Discovery," IEEE, Jan. 29, 2016, 146 pages.

Junos OS., "User Access and Authentication Administration Guide for Junos OS," Juniper Networks Inc., Jun. 14, 2023, 1786 pages.

Martin R., "IEEE P802.1, Draft 1.0, Bridges and Bridged Networks—Link Aggregation," IEEE 802.1 Working Group, Dec. 2020, Nurnberg, Germany, 349 Pages.

Moy, J., "Extending OSPF to Support Demand Circuits," Network Working Group, Request for Comments: 1793, pp. 1-32, Apr. 1995.

OpenConfig: Platform model, Website: https://openconfig.net/projects/modelsischemadocs/jstree/openconfig-platform.html, Obtained Apr. 30, 2024, 199 Pages.

Website: https://en.wikipedia.org/wiki/Traceroute; Obtained Apr. 25, 2024, 5 Pages.

100

Example Per Unit Power Metric Calculation

| 8 Slots Modular Network device | Value | Unit | Symbol |
|---|---|---|---|
| Quantity of 400G ports | 16 | | |
| Quantity of 100G ports | 144 | | |
| Network device bandwidth | 20800 | Gbps | |
| Total power consumption | 20000 | Watts | |
| Power consumption for 1 Tbps traffic for 1 hour | 0.9615 | Watts | P |
| Power consumption weight | 10 | | Wp |
| Carbon emission per Wh | 0.38 | Grams | C |
| Carbon emission weight | 5 | | Wc |
| Cost of per unit electricity | 0.134 | | E |
| Electricity cost weight | 7 | | We |
| Power cost formula for per Tbps power metric | (P x Wp) x (C x Wc) x (E x We) | | |
| Power cost for Tbps traffic | 17.136 | | |

FIG. 1F

100

Example Per Link Power Metric Calculation

| 8 Slots Modular Network device | Value | Unit | Symbol |
|---|---|---|---|
| Quantity of 400G ports | 16 | | |
| Quantity of 100G ports | 144 | | |
| Network device bandwidth | 20800 | Gbps | |
| Total power consumption | 20000 | Watts | |
| Power consumption per 400G link for 1 hour | 384.615 | Watts | P |
| Power consumption per 100G link for 1 hour | 96.154 | Watts | P |
| Power consumption weight | 10 | | Wp |
| Carbon emission per Wh | 0.38 | Grams | C |
| Carbon emission weight | 5 | | Wc |
| Cost of per unit electricity | 0.134 | | E |
| Electricity cost weight | 7 | | We |
| Power cost formula for per Tbps power metric | (P x Wp) x (C x Wc) x (E x We) | | |
| Power cost for 400G link | 6854.615 | | |
| Power cost for 100G link | 1713.654 | | |

FIG. 1G

100

Example Per Component Power Metric Calculation

| Component (PFE) with Tb Capacity | Value | Unit | Symbol |
|---|---|---|---|
| Quantity of 400G ports | 5 | | |
| Quantity of 100G ports | 30 | | |
| Component bandwidth | 5000 | Gbps | |
| Power consumption of component | 4357 | Watts | P |
| Power consumption for 1 Tbps traffic for 1 hour | 0.8714 | Watts | P |
| Power consumption weight | 10 | | Wp |
| Carbon emission per Wh | 0.38 | Grams | C |
| Carbon emission weight | 5 | | Wc |
| Cost of per unit electricity | 0.134 | | E |
| Electricity cost weight | 7 | | We |
| Power cost formula for per Tbps power metric | (P x Wp) x (C x Wc) x (E x We) | | |
| Power cost for per Tbps traffic for component | 15.53 | | |

FIG. 1H

| Network device | Power cost for 100G Link |
|---|---|
| 1 | 160 |
| 2 | 220 |
| 3 | 170 |
| 4 | 160 |
| 5 | 200 |
| 6 | 200 |

CALCULATING AND UTILIZING POWER METRICS FOR CONNECTED NETWORK DEVICES

CROSS-REFERENCE TO RELATED APPLICATION

This patent application claims priority to India Provisional Patent Application No. 202341064503, filed on Sep. 26, 2023, entitled "SYSTEMS AND METHODS FOR PROVIDING ENERGY EFFICIENT NETWORKS," and assigned to the assignee hereof. The disclosure of the prior application is considered part of and is incorporated by reference into this patent application.

BACKGROUND

An interface or port of a network device includes multiple hardware components (e.g., optics, a laser, a processor, and/or the like) that enable the network device to operate and to establish a link with another network device. An interface or port of the other network device also includes the multiple hardware components. Operation of the link, the connected network devices, and the hardware components of the connected network devices consume power.

SUMMARY

Some implementations described herein relate to a method. The method may include determining a bandwidth utilization and a power consumption by a network device, and receiving a carbon emission value and an electricity cost associated with the network device. The method may include determining weights for the power consumption, the carbon emission value, and the electricity cost, and calculating a unit power metric based on the bandwidth utilization, the power consumption, the carbon emission value, the electricity cost, and the weights. The method may include performing one or more actions based on the unit power metric.

Some implementations described herein relate to a network device. The network device may include one or more memories and one or more processors. The one or more processors may be configured to determine a bandwidth utilization and a power consumption by the network device, and receive a carbon emission value and an electricity cost associated with the network device. The one or more processors may be configured to determine weights for the power consumption, the carbon emission value, and the electricity cost, and apply the weights to the power consumption, the carbon emission value, and the electricity cost to generate a weighted power consumption, a weighted carbon emission value, and a weighted electricity cost. The one or more processors may be configured to calculate a unit power metric based on the bandwidth utilization, the weighted power consumption, the weighted carbon emission value, and the weighted electricity cost, and perform one or more actions based on the unit power metric.

Some implementations described herein relate to a non-transitory computer-readable medium that stores a set of instructions. The set of instructions, when executed by one or more processors of a network device, may cause the network device to determine a bandwidth utilization and a power consumption by the network device, and receive a carbon emission value and an electricity cost associated with the network device. The set of instructions, when executed by one or more processors of the network device, may cause the network device to determine weights for the power consumption, the carbon emission value, and the electricity cost, and calculate a power metric based on the bandwidth utilization, the power consumption, the carbon emission value, the electricity cost, and the weights. The set of instructions, when executed by one or more processors of the network device, may cause the network device to perform one or more actions based on the power metric.

BRIEF DESCRIPTION OF THE DRAWINGS

FIGS. 1A-1I are diagrams of an example associated with calculating and utilizing power metrics for connected network devices.

DETAILED DESCRIPTION

Figure 1A:
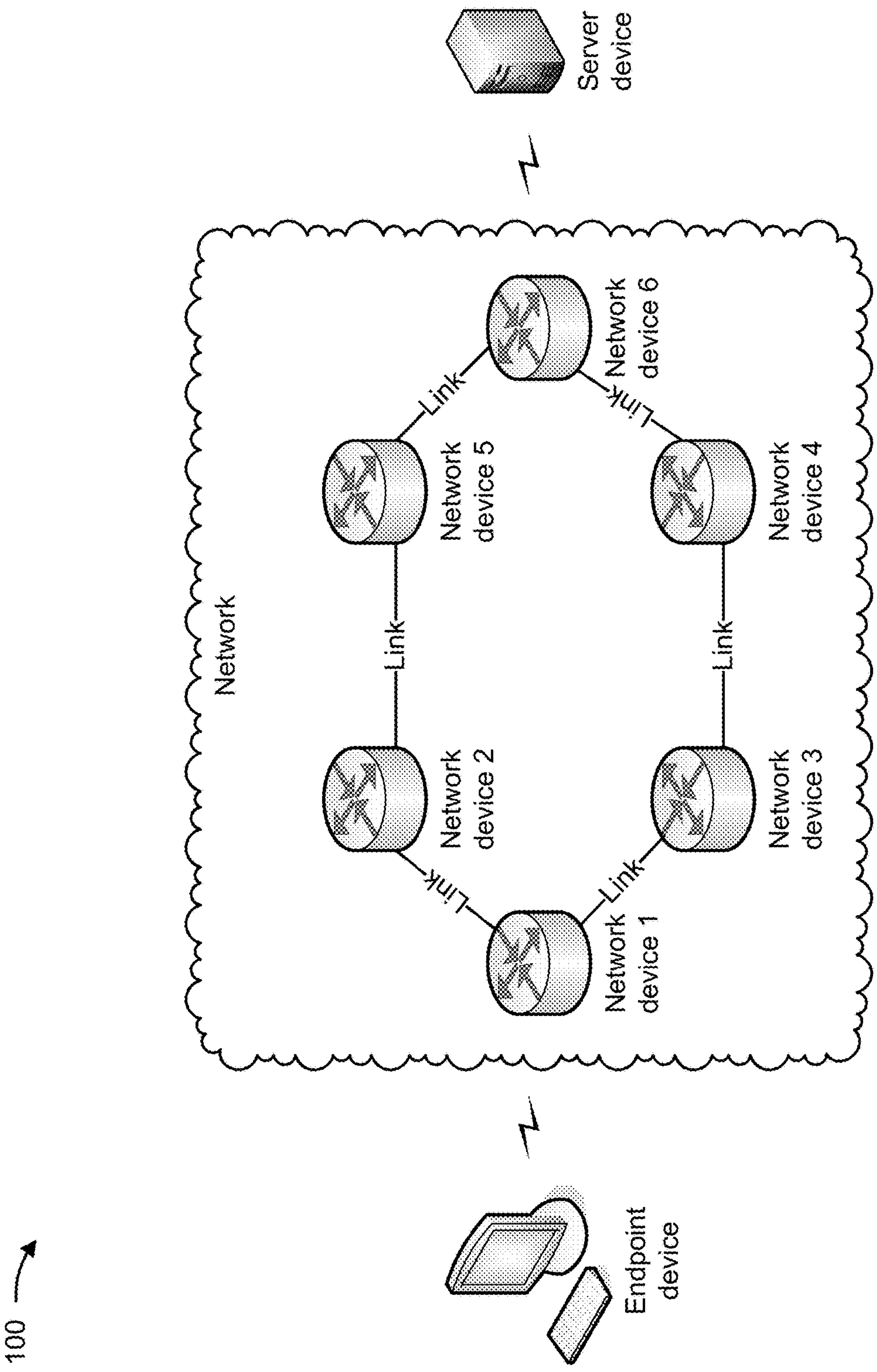

The following detailed description of example implementations refers to the accompanying drawings. The same reference numbers in different drawings may identify the same or similar elements.

Network planners design a network for worst-case traffic conditions while also catering to various potential resiliency scenarios. Typically, most of the time, the network capacity is underutilized due to traffic conditions. Also, the actual traffic patterns exhibit periodicity with regards to overall network utilization.

The total power required to keep a network device, hardware components of the network device, and a link of the network device operational is significant. The link, an interface for the link, and associated hardware components consume significant power even when the link and the interface are in an idle state (e.g., not sending or receiving traffic). For example, a network device with one hundred (100) four-hundred (400) gigabit (G) ports will consume kilowatts (kW) of power for interfaces of the network device alone. Furthermore, when two directly connected network devices are not exchanging traffic, the links and the interfaces of the network devices unnecessarily consume power. Thus, current techniques for managing network devices consume computing resources (e.g., processing resources, memory resources, communication resources, and/or the like), networking resources, and/or the like associated with failing to adjust power consumption and bandwidth of connected network devices based on a traffic rate, failing to power off links, interfaces, and/or hardware components of the connected network device during idle states and wasting power with the idle links, interfaces, and/or hardware components, failing to power off the idle links, interfaces, and/or hardware components during non-peak utilization times of the connected network devices, unnecessarily maintaining the idle links, interfaces, and/or hardware components during non-peak utilization times of the connected network devices, and/or the like.

Some implementations described herein relate to calculating and utilizing power metrics for connected network devices. For example, a network device may determine a bandwidth utilization and a power consumption by the network device, and may receive a carbon emission value and an electricity cost associated with the network device.

The network device may determine weights for the power consumption, the carbon emission value, and the electricity cost, and may calculate one or more of a unit power metric, a per link power metric, a per component power metric, or a per device power metric based on the bandwidth utilization, the power consumption, the carbon emission value, the electricity cost, and the weights. The network device may perform one or more actions based on the one or more of the unit power metric, the per link power metric, the per component power metric, or the per device power metric.

In this way, the implementations calculate and utilize power metrics for connected network devices. For example, a network device may calculate power metrics at various granularities, and may utilize the calculated power metrics to reduce power consumption by the network device. In some implementations, the network device may utilize a forwarding capacity (e.g., a bandwidth) of the network device to calculate a power metric for the network device, may utilize a bandwidth of a hardware component of the network device to calculate a power metric for the hardware component, may utilize a speed of a link of the network device to calculate a power metric for the link, may calculate a power metric per data unit of traffic processed by the network device, and/or the like. The network device may calculate the power metrics based on actual power consumption, carbon emission, electricity cost, and/or the like. During calculation of the power metrics, the network device may determine whether the per unit power cost changes dynamically, whether an environmental temperature and/or a load of the network device impacts the per unit power cost, and/or the like. The network device may periodically recalculate the power metrics to account for changing conditions at the network device.

Thus, the connected network devices conserve computing resources, networking resources, and/or the like that would otherwise have been consumed by failing to adjust power consumption and bandwidth of connected network devices based on a traffic rate, failing to power off links, interfaces, and/or hardware components of the connected network device during idle states and wasting power with the idle links, interfaces, and/or hardware components, failing to power off the idle links, interfaces, and/or hardware components during non-peak utilization times of the connected network devices, unnecessarily maintaining the idle links, interfaces, and/or hardware components during non-peak utilization times of the connected network devices, and/or the like.

FIGS. 1A-1I are diagrams of an example 100 associated with calculating and utilizing power metrics for connected network devices. As shown in FIG. 1A, the example 100 includes an endpoint device associated with a network and a server device. The network may include multiple network devices, such as a first network device (e.g., network device 1), a second network device (e.g., network device 2), a third network device (e.g., network device 3), a fourth network device (e.g., network device 4), a fifth network device (e.g., network device 5), and a sixth network device (e.g., network device 6). Links may be provided between the first network device, the second network device, the third network device, the fourth network device, the fifth network device, and the sixth network device. Further details of the endpoint device, the server device, the network, the network devices, and the links are provided elsewhere herein. Although FIGS. 1A-1I depict a single network device performing the implementations described herein, each network device of a network may also perform the implementations described herein.

Figure 1B:
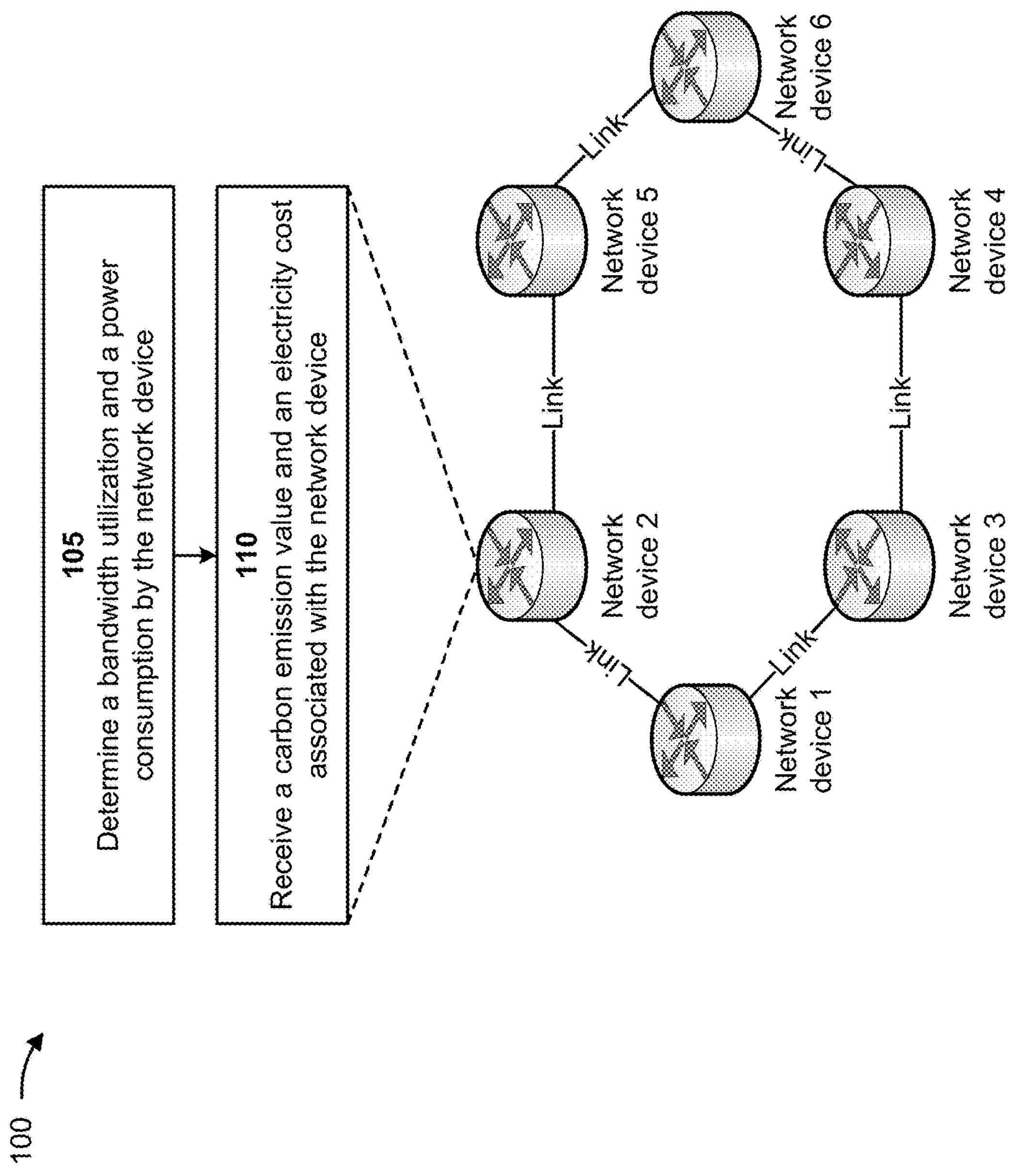

As shown in FIG. 1B, and by reference number 105, a network device (e.g., the second network device) may determine a bandwidth utilization and a power consumption by the network device. For example, the network device may utilize bandwidth and consume power when receiving traffic, processing traffic, transmitting traffic, being in an idle state, monitoring for traffic, and/or the like. The network device may monitor the bandwidth utilized by the network device over a time period, and may determine the bandwidth utilization (e.g., in gigabits per second (Gbps)) by the network device based on monitoring the bandwidth. The network device may monitor the power consumed by the network device over the time period, and may determine the power consumption (e.g., in Watts) based on monitoring the power. In some implementations, the network device may determine other information that may affect power metric calculations, such as a temperature of an environment of the network device, a temperature of the network device, a load of the network device, and/or the like.

As further shown in FIG. 1B, and by reference number 110, the network device may receive a carbon emission value and an electricity cost associated with the network device. For example, the network device may be located in a geographic region associated with a carbon emission value (e.g., per Watt-hour (Wh)). The carbon emission value (e.g., in grams) may indicate a green energy mix available in the geographic region. The network device may receive the carbon emission value from a third party source (e.g., an environmental agency), a user input, a network control system, and/or the like. The geographic region of the network device may also be associated with an electricity cost (e.g., in dollars). The electricity cost may indicate a cost per unit of electricity in the geographic region. The network device may receive the electricity cost from a third party source (e.g., a utility company providing electricity to the network device), a user input, a network control system, and/or the like.

Figure 1C:
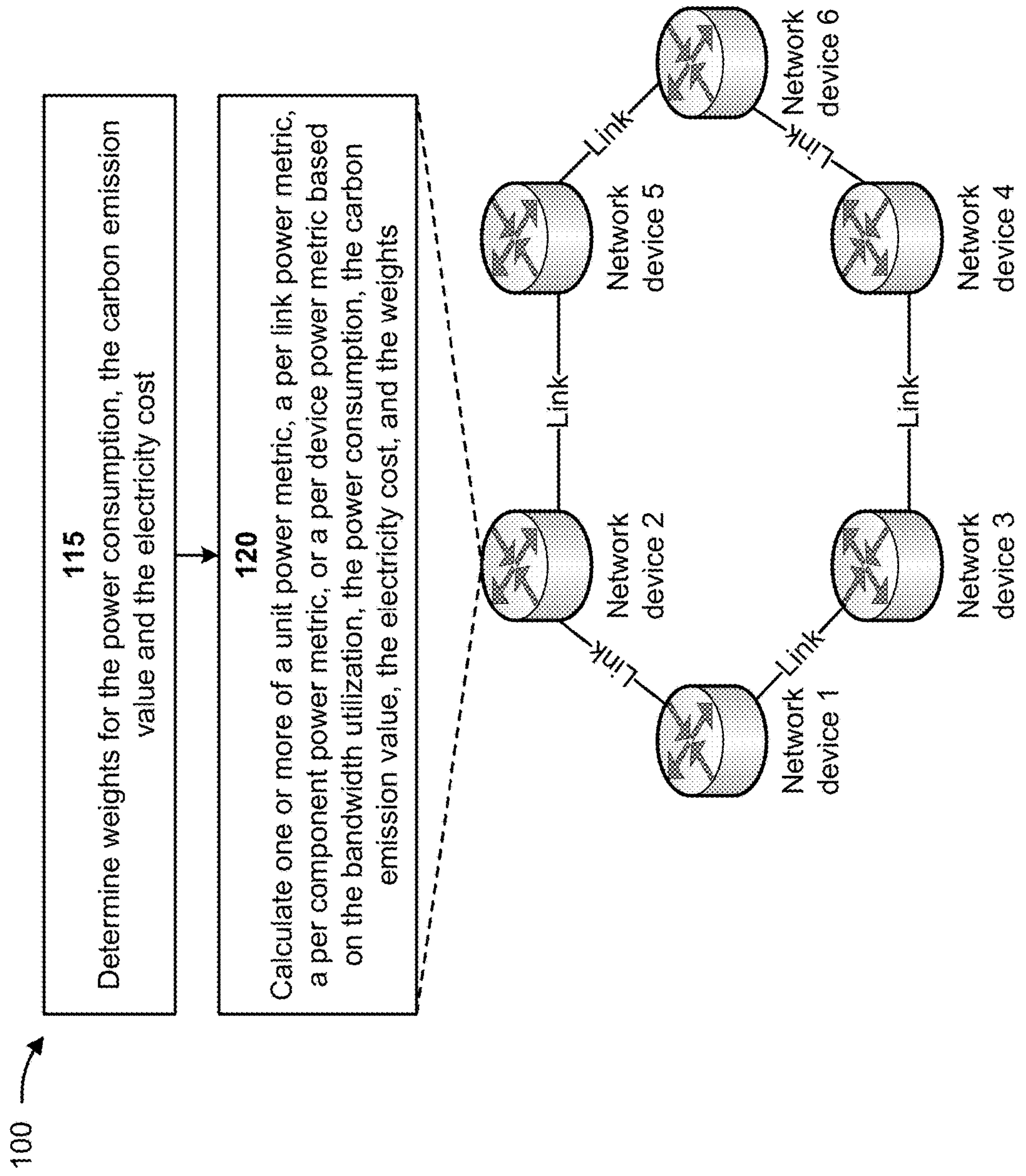

As shown in FIG. 1C, and by reference number 115, the network device may determine weights for the power consumption, the carbon emission value, and the electricity cost. For example, the network device may apply weights to the power consumption, the carbon emission value, and the electricity cost in order to satisfy a power threshold, a carbon footprint threshold, an electricity utilization threshold, and/or the like. In some implementations, the network device may determine the weights for the power consumption, the carbon emission value, and the electricity cost based on the power threshold, a carbon footprint threshold, an electricity utilization threshold, and/or the like. For example, the network device may set the weight for the carbon emission value to be greater than a weight for the electricity cost in order to satisfy the carbon footprint threshold or a network carbon footprint reduction goal. In one example, the network device may set the weight (Wp) for the power consumption to a first value (e.g., ten), may set the weight (Wc) for the carbon emission value to a second value (e.g., five), and may set the weight (We) for the electricity cost to a third value (e.g., seven). In some implementations, network device may receive the weights for the power consumption, the carbon emission value, and the electricity cost from a user input, a network control system, and/or the like.

As further shown in FIG. 1C, and by reference number 120, the network device may calculate one or more of a unit power metric, a per link power metric, a per component power metric, or a per device power metric based on the bandwidth utilization, the power consumption, the carbon emission value, the electricity cost, and the weights. For example, the network device may apply the weights to the power consumption, the carbon emission value, and the electricity cost to generate a weighted power consumption, a weighted carbon emission value, and a weighted electricity cost, and may calculate the one or more of the unit power metric, the per link power metric, the per component power metric, or the per device power metric based on the bandwidth utilization, the weighted power consumption, the weighted carbon emission value, and the weighted electricity cost.

In some implementations, the network device may determine a power consumption (Pd) of the network device for a data unit (e.g., for terabits per second (Tbps)) traffic for one hour, and may calculate the unit power metric based on the bandwidth utilization, the power consumption (Pd), the carbon emission value (C), the electricity cost (E), and the weights (Wp, Wc, and We) as follows:

$$(Pd \times Wp) \times (C \times Wc) \times (E \times We).$$

In some implementations, the network device may determine a power consumption (Pl) of a link of the network device, and may calculate the per link power metric based on the bandwidth utilization, the power consumption (Pl), the carbon emission value (C), the electricity cost (E), and the weights (Wp, Wc, and We) as follows:

$$(Pl \times Wp) \times (C \times Wc) \times (E \times We).$$

In some implementations, the network device may determine a power consumption (Pc) of a component of the network device, and may calculate the per component power metric based on the bandwidth utilization, the power consumption (Pc), the carbon emission value (C), the electricity cost (E), and the weights (Wp, Wc, and We) as follows:

$$(Pc \times Wp) \times (C \times Wc) \times (E \times We).$$

In some implementations, the network device may determine a power consumption (P) of the network device, and may calculate the per device power metric based on the bandwidth utilization, the power consumption (P), the carbon emission value (C), the electricity cost (E), and the weights (Wp, Wc, and We) as follows:

$$(P \times Wp) \times (C \times Wc) \times (E \times We).$$

Figure 1D:
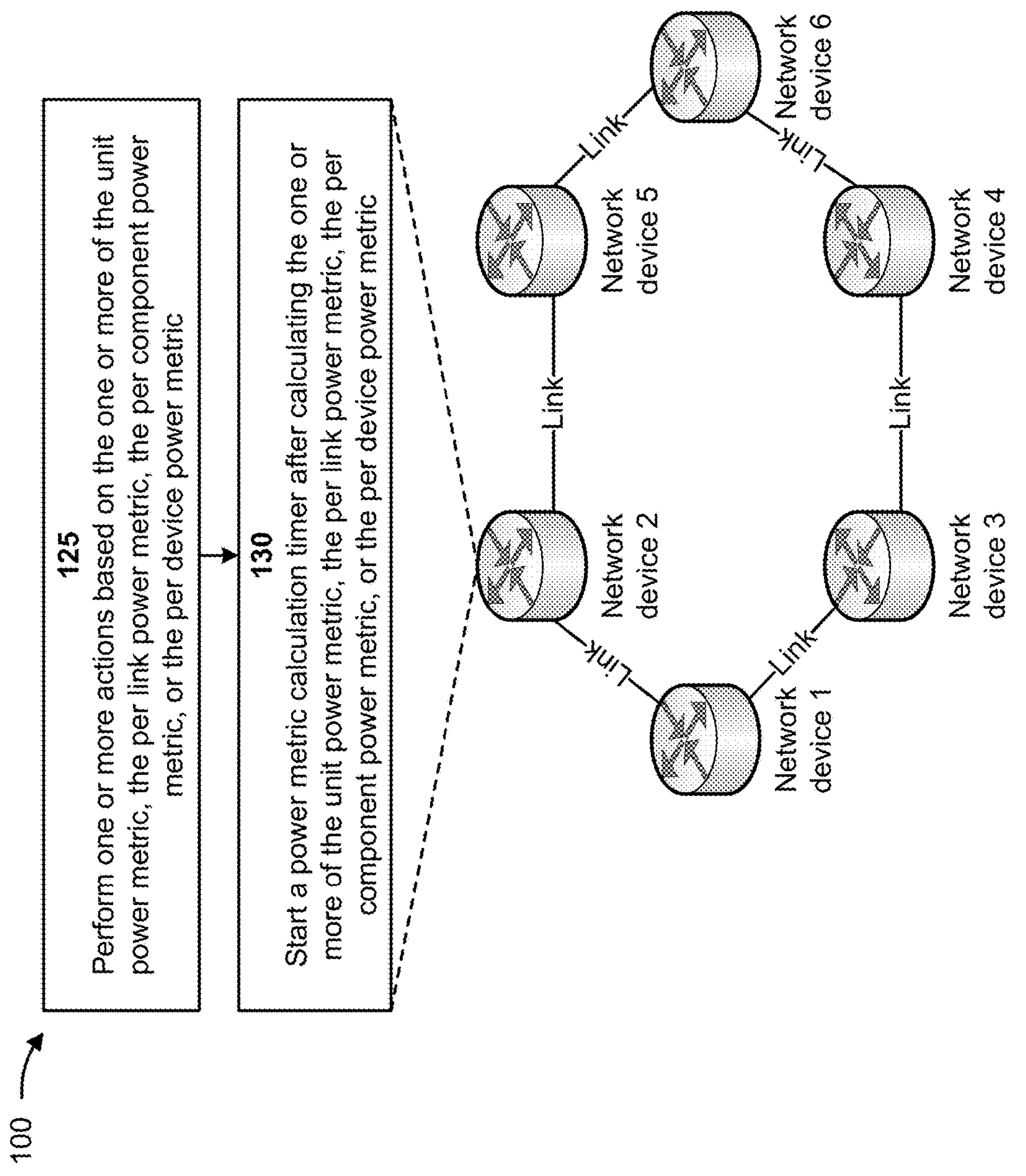

As shown in FIG. 1D, and by reference number 125, the network device may perform one or more actions based on the one or more of the unit power metric, the per link power metric, the per component power metric, or the per device power metric. For example, the network device may utilize the one or more of the unit power metric, the per link power metric, the per component power metric, or the per device power metric to perform one or more actions associated with operation of the network device.

In some implementations, performing the one or more actions may include the network device storing the one or more of the unit power metric, the per link power metric, the per component power metric, or the per device power metric in a data structure (e.g., a database, a table, a list, and/or the like) associated with the network device. For example, the network device may store the one or more power metrics in the data structure so that the network device may utilize the one or more power metrics in the future to determine routing decisions, to determine whether the network device is satisfying carbon footprint goals, and/or the like. In this way the network device conserves computing resources, networking resources, and/or the like that would otherwise have been consumed by failing to power off links, interfaces, and/or hardware components of the connected network device during idle states and wasting power with the idle links, interfaces, and/or hardware components.

In some implementations, performing the one or more actions may include the network device providing the one or more of the unit power metric, the per link power metric, the per component power metric, or the per device power metric to a network control system. For example, the network device may provide the one or more power metrics to the network control system, and the network control system may utilize the one or more power metrics to control traffic associated with the network device. In this way the network device conserves computing resources, networking resources, and/or the like that would otherwise have been consumed by unnecessarily maintaining the idle links, interfaces, and/or hardware components during non-peak utilization times of the connected network devices.

In some implementations, performing the one or more actions may include the network device utilizing the one or more of the unit power metric, the per link power metric, the per component power metric, or the per device power metric to calculate one or more paths for traffic forwarding by the network device. For example, the network device may receive traffic and may utilize the one or more power metrics to calculate one or more paths for the traffic that are the most energy efficient for the network. In this way the network device conserves computing resources, networking resources, and/or the like that would otherwise have been consumed by routing the traffic on paths that are less energy efficient for the network.

As further shown in FIG. 1D, and by reference number 130, the network device may start a power metric calculation timer after calculating the one or more of the unit power metric, the per link power metric, the per component power metric, or the per device power metric. For example, the network device may periodically perform the calculations of the one or more of the unit power metric, the per link power metric, the per component power metric, or the per device power metric. The network device may utilize the power metric calculation timer to determine when to recalculate the one or more of the unit power metric, the per link power metric, the per component power metric, or the per device power metric. The network device may start the power metric calculation timer after calculating the one or more power metrics.

Figure 1E:
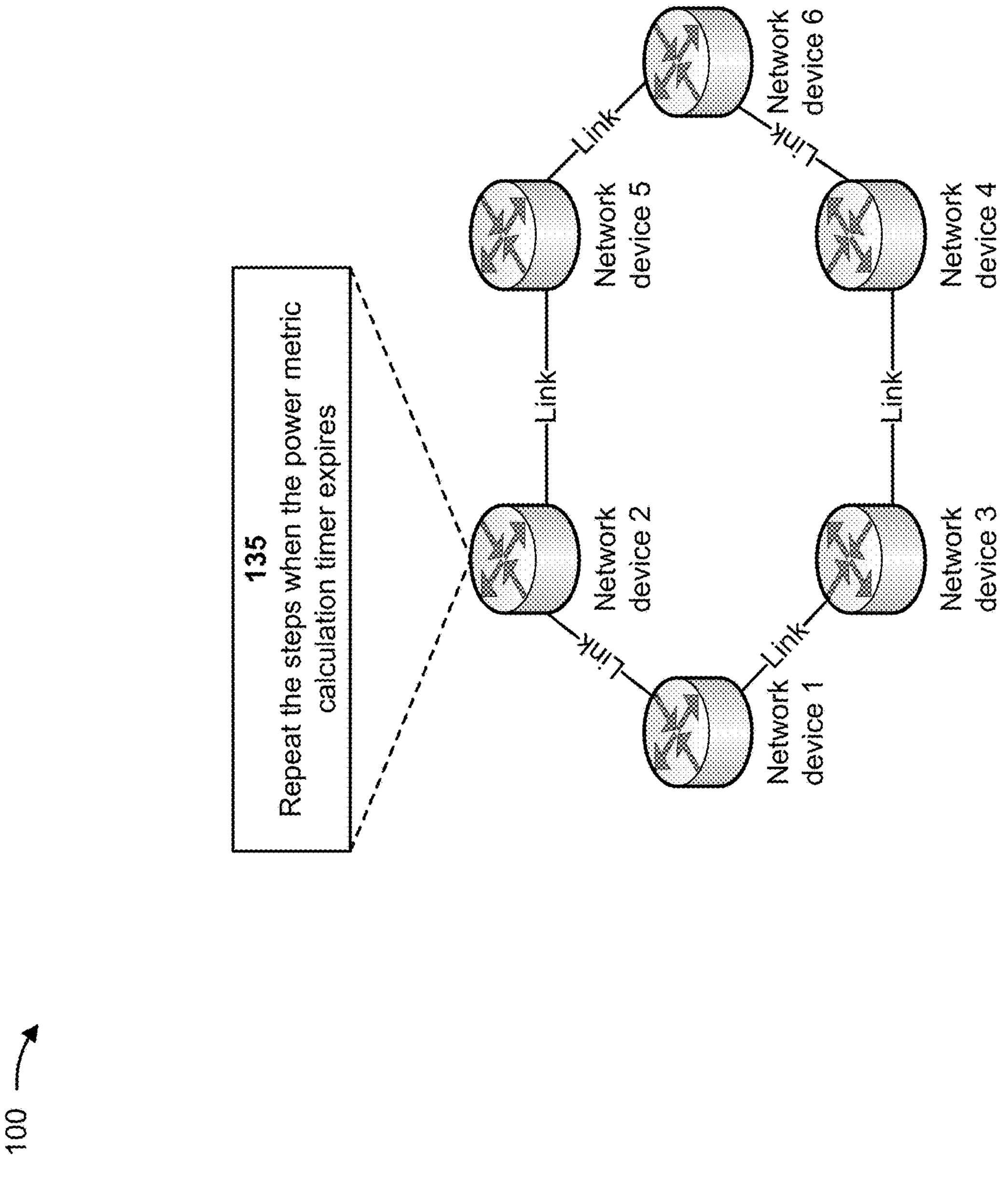

As shown in FIG. 1E, and by reference number 135, the network device may repeat the aforementioned steps when the power metric calculation timer expires. For example, when the power metric calculation timer expires, the network device may determine an updated bandwidth utilization and an updated power consumption by the network device, as described above in connection with FIG. 1B. The network device may then recalculate the one or more of the unit power metric, the per link power metric, the per component power metric, or the per device power metric based on the updated bandwidth utilization, the updated power consumption, the carbon emission value, the electricity cost, and the weights, as described above in connection with FIG. 1C. The network device may perform one or more actions based on the recalculated one or more of the unit power metric, the per link power metric, the per component power metric, or the per device power metric, as described above in connection with FIG. 1D. For example, the network device may store the recalculated one or more of the unit power metric, the per link power metric, the per component power metric, or the per device power metric in a data structure associated with the network device; may provide the recalculated one or more of the unit power metric, the per link power metric, the per component power metric, or the per device power metric to a network control system; may utilize the recalculated one or more of the unit power metric, the per link power metric, the per component power metric, or the per device power metric to calculate one or more paths for traffic forwarding by the network device; and/or the like.

FIG. 1F depicts an example of a per unit power metric calculation. As shown, a network device may include an eight (8) slot modular network device with sixteen (16) 400G ports and one-hundred and forty-four (144) 100G ports. The network device may include a bandwidth utilization of 20,800 Gbps, a total power consumption of 20,000 Watts, a power consumption of 0.9615 Watts for one Tbps traffic for one hour, and a power consumption weight of ten (10). The network device may include carbon emission value of 0.38 grams, a carbon emission weight of five (5), a cost of per unit electricity of 0.134, and an electricity cost weight of seven (7). Based on the power consumption, the power consumption weight, the carbon emission value, the carbon emission weight, cost of per unit electricity, and the electricity cost weight, the network device may calculate the per unit power metric as 17.136.

FIG. 1G depicts an example of a per link power metric calculation. As shown, a network device may include an eight (8) slot modular network device with sixteen (16) 400G ports and one-hundred and forty-four (144) 100G ports. The network device may include a bandwidth utilization of 20,800 Gbps, a total power consumption of 20,000 Watts, a power consumption of 384.615 Watts per 400G link for one hour, a power consumption of 96.154 Watts per 100G link for one hour, and a power consumption weight of ten (10). The network device may include carbon emission value of 0.38 grams, a carbon emission weight of five (5), a cost of per unit electricity of 0.134, and an electricity cost weight of seven (7). Based on the power consumptions (e.g., per 400G link and per 100G link), the power consumption weight, the carbon emission value, the carbon emission weight, cost of per unit electricity, and the electricity cost weight, the network device may calculate the per link power metric as 6,854.615 for the 400G link and as 1,713.654 for the 100G link.

FIG. 1H depicts an example of a per component power metric calculation. As shown, a network device may include a component (e.g., a packet forwarding engine (PFE)) with five (5) 400G ports and thirty (30) 100G ports. The component may include a bandwidth utilization of 5,000 Gbps, a component power consumption of 4,357 Watts, a power consumption of 0.8714 Watts for one Tbps traffic for one hour, and a power consumption weight of ten (10). The component may include carbon emission value of 0.38 grams, a carbon emission weight of five (5), a cost of per unit electricity of 0.134, and an electricity cost weight of seven (7). Based on the component power consumption, the power consumption weight, the carbon emission value, the carbon emission weight, cost of per unit electricity, and the electricity cost weight, the network device may calculate the per component power metric as 15.53.

Figure 1I:
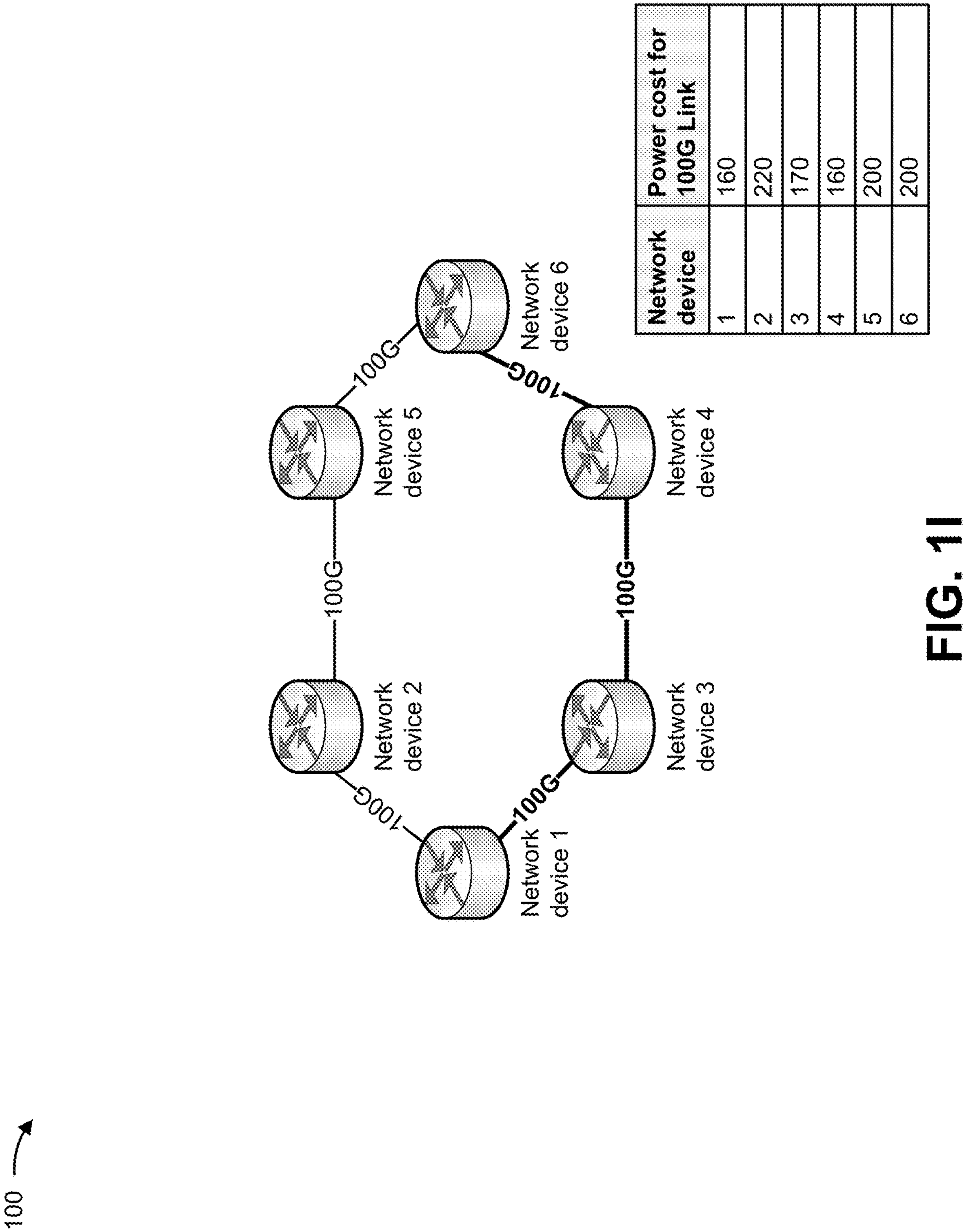

FIG. 1I depicts an example of power efficient network routing in a network utilizing an open shortest path first (OSPF) protocol or an intermediate system-to-intermediate system (IS-IS) protocol. As shown, 100G links may be provided between the network devices. The first network device may include power cost for the 100G link of 160, the second network device may include power cost for the 100G link of 220, the third network device may include power cost for the 100G link of 170, the fourth network device may include power cost for the 100G link of 160, the fifth network device may include power cost for the 100G link of 200, and the sixth network device may include power cost for the 100G link of 200.

The first network device may wish to provide traffic to the sixth network device. Accordingly, the first network device may calculate a first power cost of 690 (e.g., 160+170+160+200) for providing the traffic to the sixth network device via the third network device and the fourth network device. The first network device may calculate a second power cost of 780 (e.g., 160+220+200+200) for providing the traffic to the sixth network device via the second network device and the fifth network device. Since the second power cost is greater than the first power cost, the first network device may determine to provide the traffic to the sixth network device via the third network device and the fourth network device. Thus, the second network device and the fifth network device may implement power optimization techniques since these network devices will not be utilized for the traffic.

In some implementations, power metrics may be calculated by the various network devices when a reference power cost is 10. For example, a power metric for the second network device may be twenty-two (e.g., 220/10=22), a power metric for the third network device may be seventeen (e.g., 170/10=17), a power metric for the fourth network device may be sixteen (e.g., 160/10=16), and a power metric for the fifth network device may be twenty (e.g., 200/10=20). If the power metrics are calculated based on half of a bandwidth utilization of 10 Tbps and half of the power cost of 10, a power metric for the second network device may be sixteen (e.g., 10/2+22/2=16), a power metric for the third network device may be 13.5 (e.g., 10/2+17/2=13.5), a power metric for the fourth network device may be thirteen (e.g., 10/2+16/2=13), and a power metric for the fifth network device may be fifteen (e.g., 10/2+20/2=15).

In this way, the implementations calculate and utilize power metrics for connected network devices. For example, a network device may calculate power metrics at various granularities, and may utilize the calculated power metrics to reduce power consumption by the network device. In some implementations, the network device may utilize a forwarding capacity (e.g., a bandwidth) of the network device to calculate a power metric for the network device, may utilize a bandwidth of a hardware component of the network device to calculate a power metric for the hardware component, may utilize a speed of a link of the network device to calculate a power metric for the link, may calculate a power metric per data unit of traffic processed by the network device, and/or the like. The network device may calculate the power metrics based on actual power consumption, carbon emission, electricity cost, and/or the like. During calculation of the power metrics, the network device may determine whether the per unit power cost changes dynamically, whether an environmental temperature and/or a load of the network device impacts the per unit power cost, and/or the like. The network device may periodically recalculate the power metrics to account for changing conditions at the network device.

Thus, the connected network devices conserve computing resources, networking resources, and/or the like that would otherwise have been consumed by failing to adjust power consumption and bandwidth of connected network devices based on a traffic rate, failing to power off links, interfaces, and/or hardware components of the connected network device during idle states and wasting power with the idle links, interfaces, and/or hardware components, failing to power off the idle links, interfaces, and/or hardware components during non-peak utilization times of the connected network devices, unnecessarily maintaining the idle links, interfaces, and/or hardware components during non-peak utilization times of the connected network devices, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
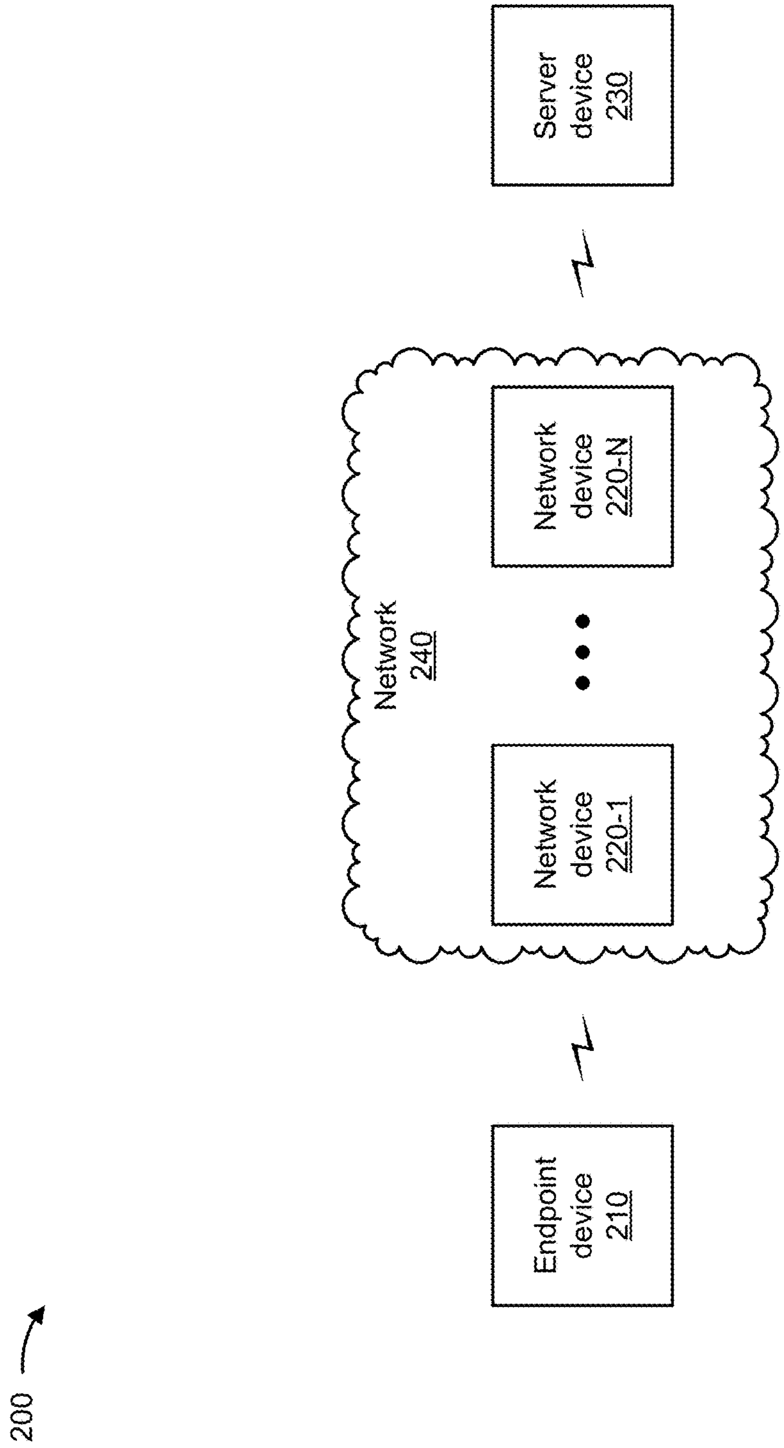
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
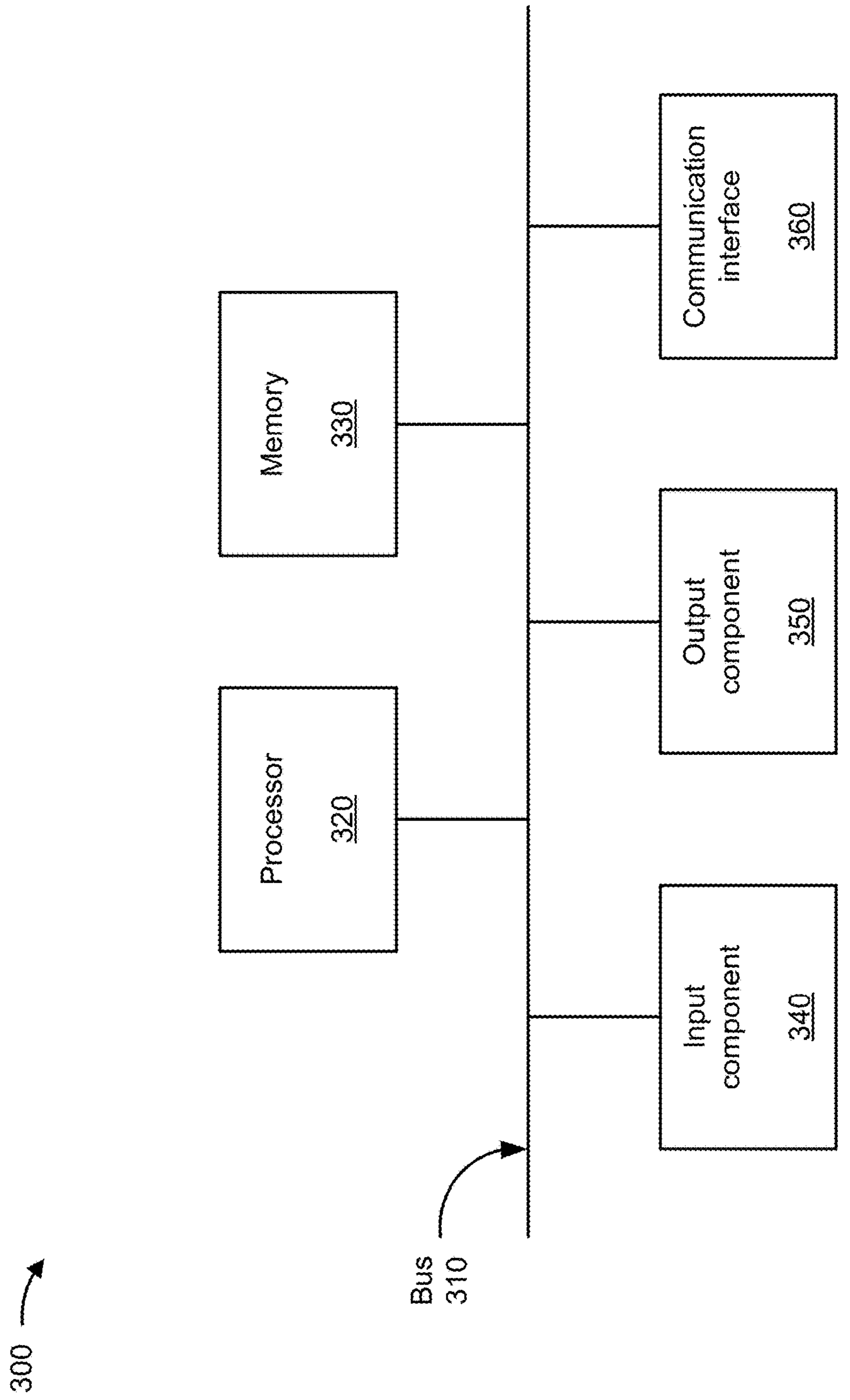
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
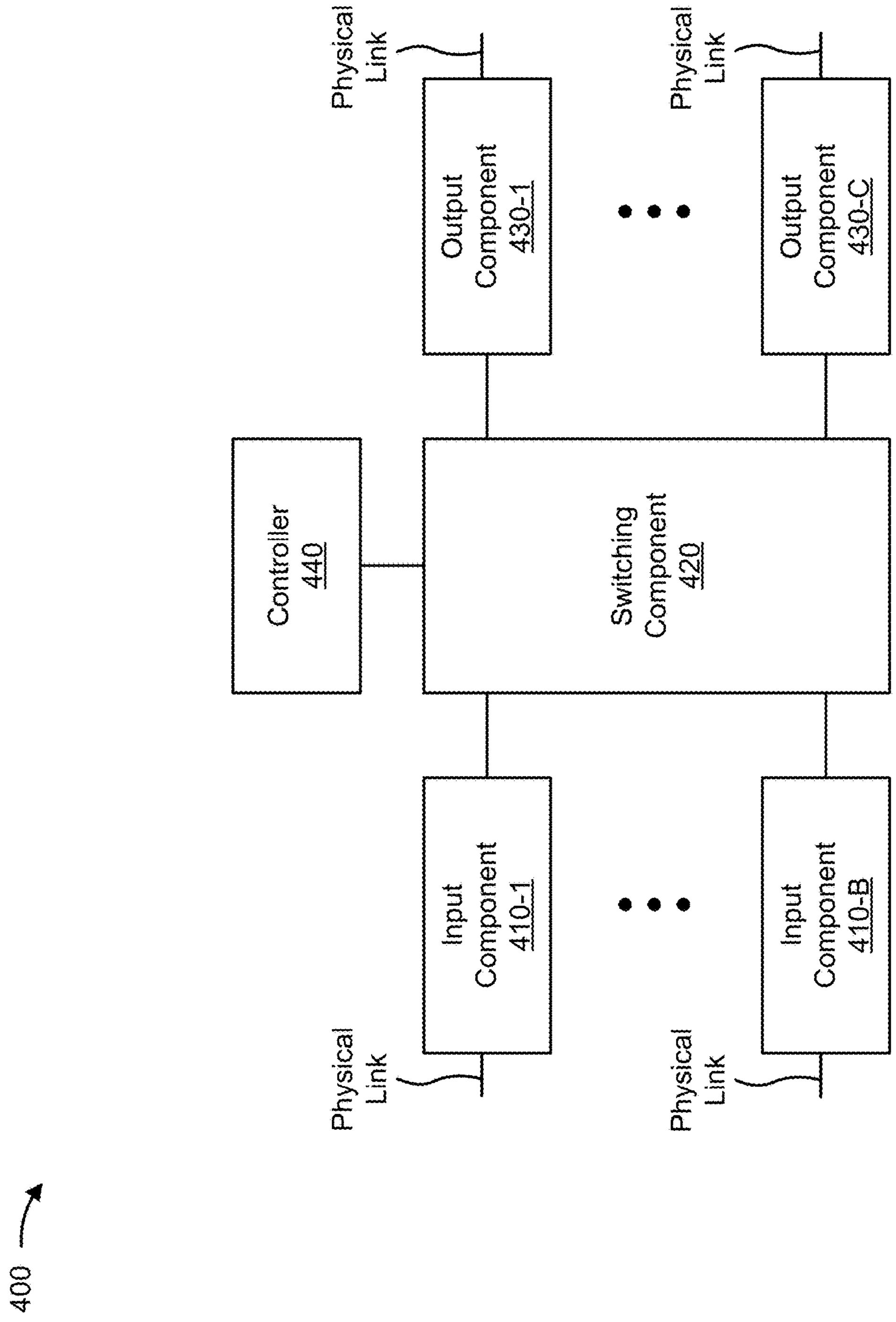

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
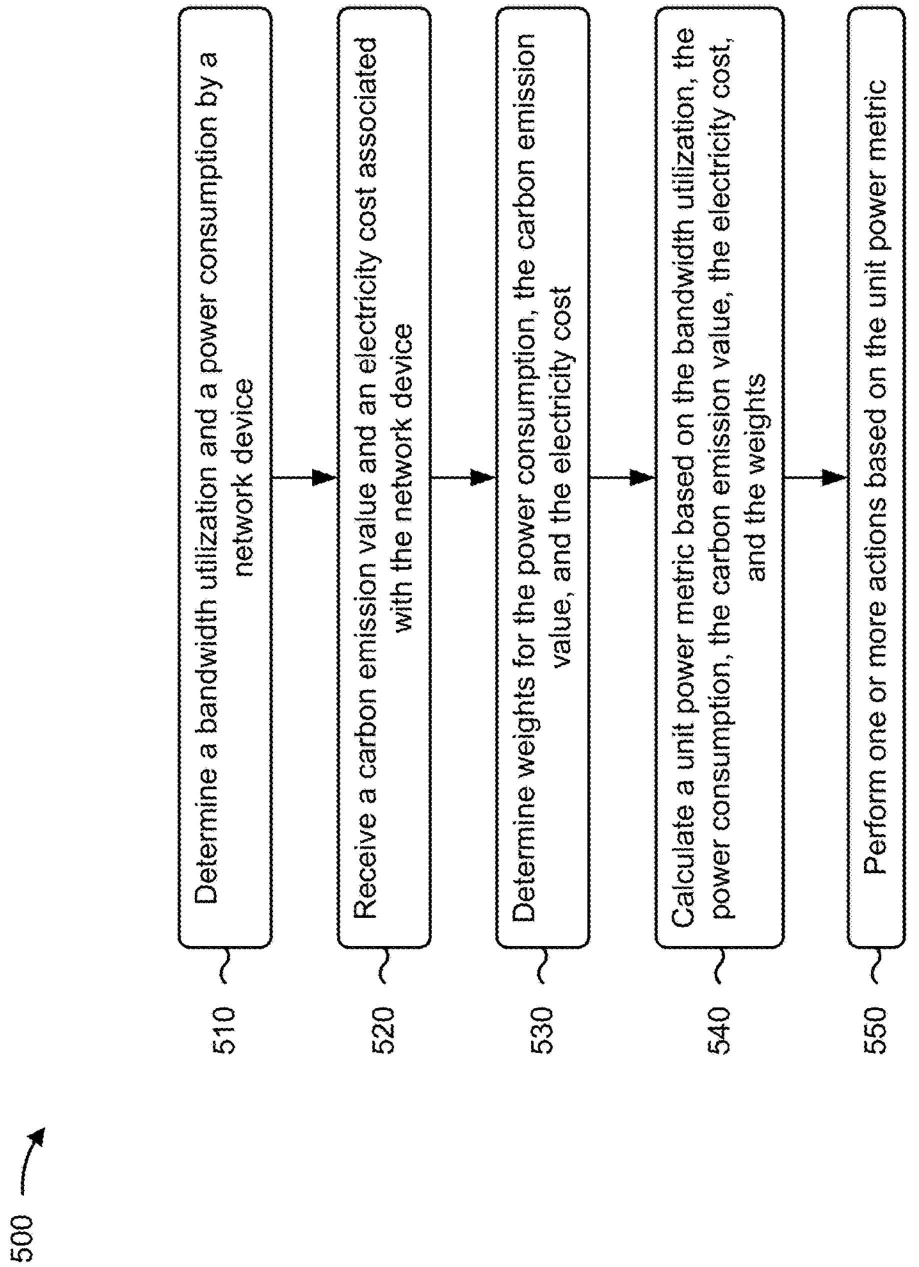
FIG. 5 is a flowchart of an example process for calculating and utilizing power metrics for connected network devices.

FIG. 5 is a flowchart of an example process 500 for calculating and utilizing power metrics for connected network devices. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining a bandwidth utilization and a power consumption by the network device (block 510). For example, the network device may determine a bandwidth utilization and a power consumption by the network device, as described above.

As further shown in FIG. 5, process 500 may include receiving a carbon emission value and an electricity cost associated with the network device (block 520). For example, the network device may receive a carbon emission value and an electricity cost associated with the network device, as described above.

As further shown in FIG. 5, process 500 may include determining weights for the power consumption, the carbon emission value, and the electricity cost (block 530). For example, the network device may determine or receive weights for the power consumption, the carbon emission value, and the electricity cost, as described above.

As further shown in FIG. 5, process 500 may include calculating a unit power metric based on the bandwidth utilization, the power consumption, the carbon emission value, the electricity cost, and the weights (block 540). For example, the network device may calculate a unit power metric based on the bandwidth utilization, the power consumption, the carbon emission value, the electricity cost, and the weights, as described above.

As further shown in FIG. 5, process 500 may include performing one or more actions based on the unit power metric (block 550). For example, the network device may perform one or more actions based on the unit power metric, as described above. In some implementations, performing the one or more actions includes one or more of storing the unit power metric in a data structure, or utilizing the unit power metric to calculate one or more paths for traffic forwarding by the network device.

In some implementations, process 500 includes calculating a per link power metric based on the bandwidth utilization, the power consumption, the carbon emission value, the electricity cost, and the weights, and performing one or more additional actions based on the per link power metric. In some implementations, performing the one or more additional actions includes one or more of storing the per link power metric in a data structure, or utilizing the per link power metric to calculate one or more paths for traffic forwarding by the network device. In some implementations, process 500 includes determining, after expiration of a predetermined time period, an updated bandwidth utilization and an updated power consumption by the network device, and recalculating the per link power metric based on the updated bandwidth utilization, the updated power consumption, the carbon emission value, the electricity cost, and the weights.

In some implementations, process 500 includes calculating a per component power metric based on the bandwidth utilization, the power consumption, the carbon emission value, the electricity cost, and the weights, and performing one or more additional actions based on the per component power metric. In some implementations, performing the one or more additional actions includes one or more of storing the per component power metric in a data structure, or utilizing the per component power metric to calculate one or more paths for traffic forwarding by the network device. In some implementations, process 500 includes determining, after expiration of a predetermined time period, an updated bandwidth utilization and an updated power consumption by the network device, and recalculating the per component power metric based on the updated bandwidth utilization, the updated power consumption, the carbon emission value, the electricity cost, and the weights.

In some implementations, process 500 includes calculating a per device power metric based on the bandwidth utilization, the weighted power consumption, the weighted carbon emission value, and the weighted electricity cost, and performing one or more additional actions based on the per device power metric. In some implementations, performing one or more additional actions includes one or more of storing the per device power metric in a data structure, or utilizing the per device power metric to calculate one or more paths for traffic forwarding by the network device. In some implementations, process 500 includes determining, after expiration of a predetermined time period, an updated bandwidth utilization and an updated power consumption by the network device, and recalculating the per device power metric based on the updated bandwidth utilization, the updated power consumption, the carbon emission value, the electricity cost, and the weights.

In some implementations, process 500 includes determining, after expiration of a predetermined time period, an updated bandwidth utilization and an updated power consumption by the network device, and recalculating the unit power metric based on the updated bandwidth utilization, the updated power consumption, the carbon emission value, the electricity cost, and the weights. In some implementations, process 500 includes calculating one or more of a per link power metric, a per component power metric, or a per device power metric based on the bandwidth utilization, the power consumption, the carbon emission value, the electricity cost, and the weights, and performing one or more additional actions based on the one or more of the per link power metric, the per component power metric, or the per device power metric.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by a network device comprising a packet forwarding engine with a plurality of links, respective power consumptions of the plurality of links and a bandwidth utilization of the network device;

receiving, by the network device, a carbon emission value and an electricity cost associated with the network device;

determining, by the network device, weights for the respective power consumptions of the plurality of links, the carbon emission value, and the electricity cost;

calculating, by the network device, a per link power metric based on the bandwidth utilization, the respective power consumptions of the plurality of links, the carbon emission value, the electricity cost, and the weights; and forwarding traffic, by the network device, over one or more paths determined based at least in part on the per link power metric.

2. The method of claim 1, further comprising:

calculating a unit power metric based on the bandwidth utilization, a power consumption of the network device, the carbon emission value, the electricity cost, and the weights; and performing one or more additional actions based on the unit power metric.

3. The method of claim 1, further comprising:

storing the per link power metric in a data structure.

4. The method of claim 2, further comprising:

determining, after expiration of a predetermined time period, an updated bandwidth utilization and an updated power consumption by the network device; and recalculating the unit power metric based on the updated bandwidth utilization, the updated power consumption, the carbon emission value, the electricity cost, and the weights.

5. The method of claim 1, further comprising:

calculating a per component power metric based on the bandwidth utilization, a power consumption of the network device, the carbon emission value, the electricity cost, and the weights; and performing one or more additional actions based on the per component power metric.

6. The method of claim 5, wherein performing the one or more additional actions comprises one or more of:

storing the per component power metric in a data structure; or utilizing the per component power metric to calculate one or more paths for traffic forwarding by the network device.

7. The method of claim 5, further comprising:

determining, after expiration of a predetermined time period, an updated bandwidth utilization and an updated power consumption by the network device; and recalculating the per component power metric based on the updated bandwidth utilization, the updated power consumption, the carbon emission value, the electricity cost, and the weights.

8. A network device, comprising:

one or more memories;

a packet forwarding engine with a plurality of links; and one or more processors configured to:

determine respective power consumptions of the plurality of links and a bandwidth utilization of the network device;

receive a carbon emission value and an electricity cost associated with the network device;

determine weights for the respective power consumptions of the plurality of links, the carbon emission value, and the electricity cost;

apply the weights to the respective power consumptions of the plurality of links, the carbon emission value, and the electricity cost to generate respective weighted power consumptions of the plurality of links, a weighted carbon emission value, and a weighted electricity cost;

calculate a per link power metric based on the bandwidth utilization, the respective weighted power consumptions, the weighted carbon emission value, and the weighted electricity cost; and forward traffic over one or more paths determined based at least in part on the per link power metric.

9. The network device of claim 8, wherein the one or more processors are further configured to:

calculate a per device power metric based on the bandwidth utilization, a weighted power consumption of the network device, the weighted carbon emission value, and the weighted electricity cost; and perform one or more additional actions based on the per device power metric.

10. The network device of claim 9, wherein the one or more processors, to perform the one or more additional actions, are configured to:

store the per device power metric in a data structure; or utilize the per device power metric to calculate the one or more paths for traffic forwarding by the network device.

11. The network device of claim 9, wherein the one or more processors are further configured to:

determine, after expiration of a predetermined time period, an updated bandwidth utilization and an updated power consumption by the network device; and recalculate the per device power metric based on the updated bandwidth utilization, the updated power consumption, the carbon emission value, the electricity cost, and the weights.

12. The network device of claim 8, wherein the one or more processors are configured to:

store the per link power metric in a data structure.

13. The network device of claim 8, wherein the one or more processors are further configured to:

determine, after expiration of a predetermined time period, an updated bandwidth utilization and updated respective power consumptions of the plurality of links; and recalculate the per link power metric based on the updated bandwidth utilization, the updated respective power consumptions, the carbon emission value, the electricity cost, and the weights.

14. The network device of claim 9, wherein the one or more processors are further configured to:

calculate a per component power metric or a per device power metric based on the bandwidth utilization, the weighted power consumption, the weighted carbon emission value, and the weighted electricity cost; and perform one or more additional actions based on the per component power metric or the per device power metric.

15. A non-transitory computer-readable medium storing a set of instructions, the set of instructions comprising:

one or more instructions that, when executed by one or more processors of a network device comprising a packet forwarding engine with a plurality of links, cause the network device to:

determine respective power consumptions of the plurality of links and a bandwidth utilization of the network device;

receive a carbon emission value and an electricity cost associated with the network device;

determine weights for the respective power consumptions of the plurality of links, the carbon emission value, and the electricity cost;

calculate a power metric based on the bandwidth utilization, the power consumption, the carbon emission value, the electricity cost, and the weights; and forward traffic over one or more paths determined based at least in part on the power metric.

16. The non-transitory computer-readable medium of claim 15, wherein the power metric includes one or more of a unit power metric, a per link power metric, a per component power metric, or a per device power metric.

17. The non-transitory computer-readable medium of claim 15, wherein the one or more instructions further cause the network device to:

store the power metric in a data structure.

18. The non-transitory computer-readable medium of claim 15, wherein the one or more instructions further cause the network device to:

determine, after expiration of a predetermined time period, an updated bandwidth utilization and an updated respective power consumptions of the plurality of links; and recalculate the power metric based on the updated bandwidth utilization, the updated respective power consumptions, the carbon emission value, the electricity cost, and the weights, to generate a recalculated power metric.

19. The non-transitory computer-readable medium of claim 18, wherein the one or more instructions further cause the network device to:

perform one or more additional actions based on the recalculated power metric.

20. The non-transitory computer-readable medium of claim 19, wherein the one or more instructions, that cause the network device to perform the one or more additional actions, cause the network device to:

store the recalculated power metric in a data structure; or utilize the recalculated power metric to calculate one or more paths for traffic forwarding by the network device.

* * * * *